(12) United States Patent
Schmitt

(10) Patent No.: US 9,651,141 B2
(45) Date of Patent: May 16, 2017

(54) METHOD FOR CONTROLLING A MOTOR VEHICLE TRANSMISSION

(71) Applicant: Schaeffler Technologies GmbH & Co. KG, Herzogenaurach (DE)

(72) Inventor: Werner Schmitt, Sinzheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 272 days.

(21) Appl. No.: 14/409,902

(22) PCT Filed: Jun. 14, 2013

(86) PCT No.: PCT/EP2013/062316
§ 371 (c)(1),
(2) Date: Dec. 19, 2014

(87) PCT Pub. No.: WO2014/001098
PCT Pub. Date: Jan. 3, 2014

(65) Prior Publication Data
US 2015/0226318 A1  Aug. 13, 2015

(30) Foreign Application Priority Data

Jun. 26, 2012 (DE) .................. 10 2012 210 859
Jul. 19, 2012 (DE) .................. 10 2012 212 695

(51) Int. Cl.
*F16H 61/00* (2006.01)
*G05B 19/042* (2006.01)
*H04L 29/08* (2006.01)

(52) U.S. Cl.
CPC ..... *F16H 61/0003* (2013.01); *G05B 19/0426* (2013.01); *H04L 67/12* (2013.01); *F16H 2061/0062* (2013.01)

(58) Field of Classification Search
None
See application file for complete search history.

(56) References Cited

U.S. PATENT DOCUMENTS

| 5,521,588 | A | 5/1996 | Kuhner et al. |
| 5,899,950 | A * | 5/1999 | Milender ........... G05B 19/0426 318/568.13 |
| 6,104,971 | A | 8/2000 | Fackler |
| 7,299,098 | B2 | 11/2007 | Gruenewald et al. |
| 7,502,353 | B2 | 3/2009 | Bolz |
| 8,007,057 | B2 * | 8/2011 | Niessen ................. F16D 48/06 303/191 |
| 8,052,579 | B2 | 11/2011 | Eich et al. |

(Continued)

FOREIGN PATENT DOCUMENTS

| DE | 4230796 A1 | 3/1994 |
| DE | 4315494 C1 | 9/1994 |

(Continued)

*Primary Examiner* — Justin Holmes
(74) *Attorney, Agent, or Firm* — Simpson & Simpson, PLLC

(57) ABSTRACT

A method for controlling a motor vehicle transmission having a transmission actuator to actuate the vehicle transmission, having a vehicle clutch with a clutch actuator to actuate the vehicle clutch, having a first control unit which has a memory area that is unambiguously assigned to it, having a second control unit which has a memory area that is unambiguously assigned to it.

30 Claims, 2 Drawing Sheets

(56) References Cited

U.S. PATENT DOCUMENTS

| | | | |
|---|---|---|---|
| 8,490,391 B2 | 7/2013 | Franz et al. | |
| 2002/0110146 A1 | 8/2002 | Thayer et al. | |
| 2007/0198145 A1* | 8/2007 | Norris | H04L 67/12 701/23 |
| 2008/0288768 A1 | 11/2008 | Barowski et al. | |
| 2012/0217117 A1 | 8/2012 | Gramann et al. | |
| 2013/0024081 A1* | 1/2013 | Gerhart | F16D 48/066 701/67 |

FOREIGN PATENT DOCUMENTS

| | | |
|---|---|---|
| DE | 19616166 A1 | 10/1997 |
| DE | 10153085 A1 | 5/2003 |
| DE | 10237715 A1 | 2/2004 |
| DE | 102006020562 A1 | 11/2007 |
| DE | 102008023360 A1 | 12/2008 |
| DE | 102010047800 A1 | 5/2011 |
| DE | 102010047801 A1 | 5/2011 |
| DE | 102011005088 A1 | 9/2011 |

* cited by examiner

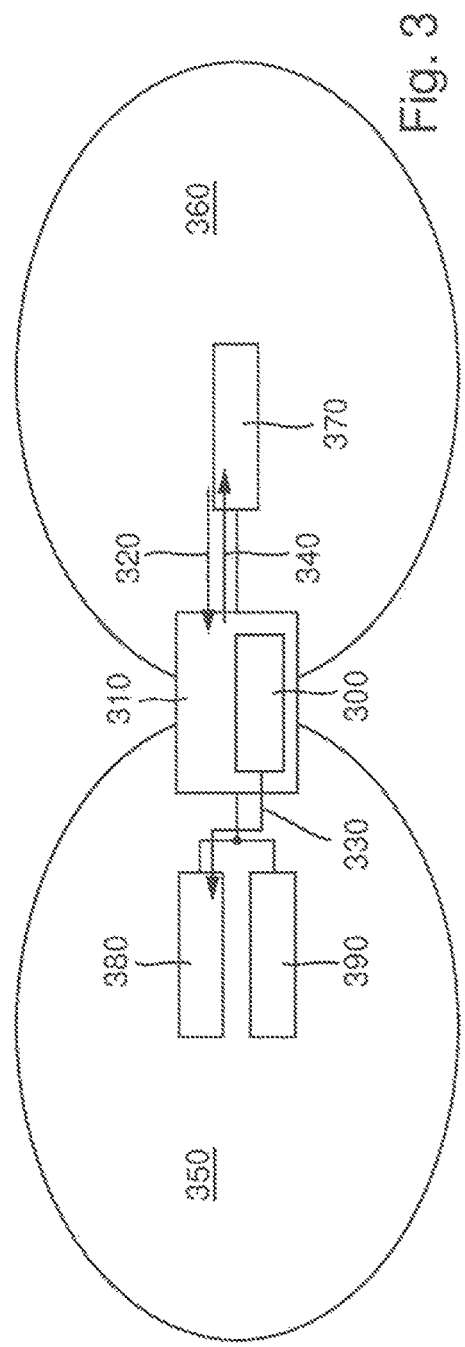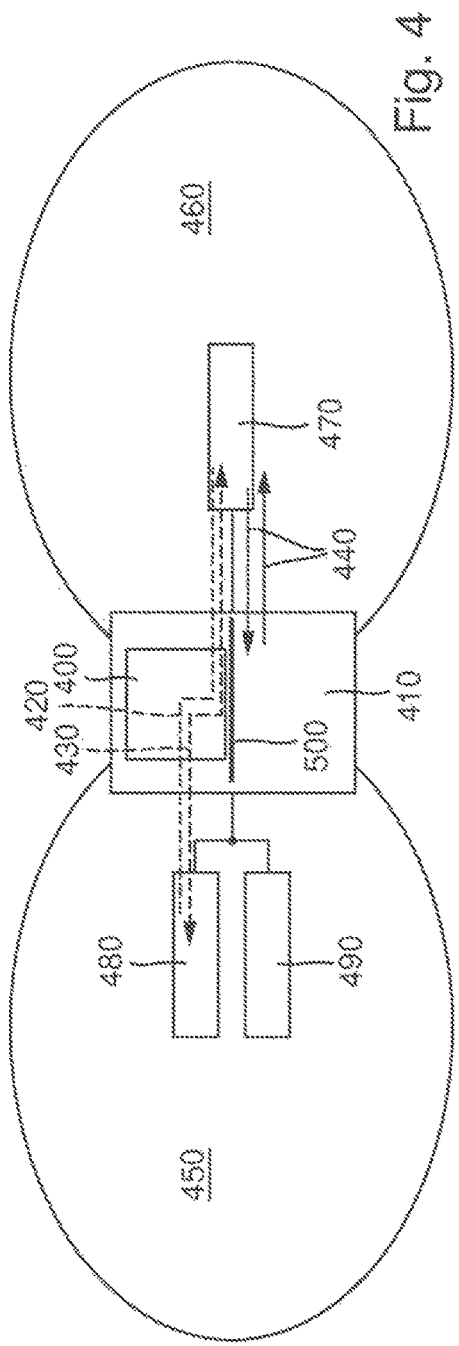

METHOD FOR CONTROLLING A MOTOR VEHICLE TRANSMISSION

CROSS-REFERENCE TO RELATED APPLICATIONS

The present application is the U.S. national stage application pursuant to 35 U.S.C. §371 of International Application No. PCT/EP2013/062316, filed on Jun. 14, 2013, which application claims priority from German Patent Application Nos. DE 10 2012 210 859.9, filed on Jun. 26, 2012, and DE 10 2012 212 695.3, filed on Jul. 19, 2012, which applications are incorporated herein by reference in their entireties.

TECHNICAL FIELD

The present invention relates generally to a method for controlling a transmission of a motor vehicle, and, more specifically, for controlling clutch and transmission systems and, even more specifically, for controlling dual-clutch transmission systems.

BACKGROUND

Within the framework of this document, the abbreviation "TCU" is understood to mean any transmission control unit for controlling a motor vehicle transmission, any clutch control unit for controlling one or more motor vehicle shifting clutches, and in particular any control unit for controlling a transmission as well as for controlling one or more shifting clutches, in particular any control unit for controlling a dual-clutch transmission. Dual-clutch transmissions have long been known, and are described, for example, in German reference no. DE 10 2008 023 360 A1 (Eich et al.). The terms "TCU" and "control unit TCU" are used synonymously.

Within the framework of this document, the abbreviation "HCA" is understood to mean any actuator, for example, for operating an automated friction clutch, for example, a hydraulically operated clutch actuator, in particular a hydrostatically operated clutch operator (hydrostatic clutch actuator) as disclosed, for example, in German reference no. DE 10 2010 047 801 (Franz et al.) or German reference no. DE 10 2010 047 800 (Gramann et al.). However, every HCA must have at least one non-volatile memory as well as one local control unit (LCU) unambiguously and firmly assigned to it. The non-volatile memory is located, for example, in the local control unit (LCU) of the HCA.

Dual-clutch transmission systems have, for example, a TCU HCA system.

The abbreviation "SW" is to be understood within the framework of this document to mean software.

Within the framework of this document, the terms diagnostic routine, diagnostic function, diagnostic service and diagnostic command are used interchangeably or essentially synonymously.

Within the framework of this document, the terms software, routine, function and process are likewise used essentially synonymously.

The components used, for example, in dual-clutch transmissions, depending on their design, have one or more control units, including flash memories for the application SW. A SW update may become necessary due to model year updates or error correction (bug fixes).

In dual-clutch systems, normally two actuators are used (one actuator for each clutch), such as, for example, the HCA, whose control unit (LCU) is also equipped with a flash memory. Since the same application SW is used for both LCUs, for reasons of simplification, in the event of a SW update both LCUs must also be updated, each LCU separately. The flash process is usually initiated, carried out and monitored for correct execution by a test device. The flash process takes place via a CAN bus, with the control unit (TCU) connected ahead of the LCU enabling the connection between LCU and tester by means of a gateway function.

The program memory within the LCU is very limited; integrating additional SW functionality must always be reconsidered therefore against the background of the limited memory resources.

In particular, the function which enables the updating of the control unit code (LCU application SW) of the HCA is rarely needed but—if it is carried out by means of the client-specific diagnostic protocol—still demands extensive memory space. By protocol, it is meant a communication protocol, which is well known in the art as a system of rules that allows two or more entities of a communications system to transmit information via any kind of variation of a physical quantity. These are the rules or standard that defines the syntax, semantics, and synchronization of communication and possible error recovery methods. Protocols may be implemented by hardware, software, or a combination of both. A different protocol, for example Open-source CAN Calibration Protocol (CCP) or Universal Measurement and Calibration Protocol (XCP), which is used for this purpose during development, requires much less memory space.

As shown in FIG. 1, the flashing of LCU 150,160 always takes place by means of diagnostic tester 140; there is usually no direct connection of LCU 150,160 to tester 140, but rather—by means of a gateway function in TCU 110—only through transmission control unit TCU 110. TCU 110 forwards 120 the commands from the tester to the LCU, and as a countermove returns 130 the responses of the LCU to the tester. All of this takes place via the client-specific diagnostic protocol, for example, the Unified Diagnostic Services (UDS) protocol, which must be stored both in TCU 110 and in the LCU for this purpose. The gateway function allows change-free transmission of the messages in both directions. Such methods are also explained, for example, in German Patent No. DE 101 53 085 A1 (Gruenewald et al.), German Patent No. DE 43 15 494 C1 (Keuhner et al.), German Patent No. DE 102 37 715 A1 (Bolz) and German Patent No. DE 196 16 166 A1 (Fackler).

SUMMARY

The present invention comprises a method for controlling a motor vehicle transmission, the motor vehicle transmission having a transmission actuator to actuate the vehicle transmission, a vehicle clutch with a clutch actuator to actuate the vehicle clutch, a first control unit having a first memory area, a second control unit having a second memory area, and a third control unit, the method for controlling the motor vehicle transmission including the steps of: exchanging information between the first and third control units via the second control unit, exchanging information between the first and the second control units on the basis of a first communication protocol and exchanging information between the second and the third control units on the basis of a second communication protocol and controlling the motor vehicle transmission based on the exchanged information between the first and the third control units, the first and the second control units, and the second and the third control units.

A general object of the present invention is to provide the flash functionality with reduced storage space demand within the LCU.

According to the invention, a method is provided for controlling a motor vehicle transmission having a transmission actuator to actuate the vehicle transmission, having a vehicle clutch with a clutch actuator to actuate the vehicle clutch, having a first control unit which has a memory area that is unambiguously assigned to it, having a second control unit which has a memory area that is unambiguously assigned to it. According to the invention, a third control unit is provided, wherein an information exchange between the third and the first control units is provided via the second control unit, wherein to that end an information exchange between the third and the second control unit and an information exchange between the first and the second control unit is provided, wherein the information exchange between the first and the second control unit is provided on the basis of a first communication protocol and the information exchange between the second and the third control unit is provided on the basis of a second communication protocol.

In an example embodiment of the invention it is provided that on the first control unit and the second control unit the first communication protocol is available, and on the second control unit and on the third control unit the second communication protocol is available.

In an example embodiment of the invention it is provided that the memory demand for the first communication protocol is less than for the second communication protocol.

Information exchange may be data exchange, exchange of computer programs, exchange of commands or the like.

For example, this may be the transfer of a computer program (LCU SW) for the LCU (first control unit) which is present in the tester (third control unit)—for example, a new update version—into the memory area of the LCU (first control unit).

However, it may also be the transfer of previously obtained startup data of startup parameters present in the tester (third control unit) into the memory area of the LCU (first control unit).

It may also have to do with a transfer of the startup data from the memory area of the LCU into the memory area of the TCU.

In an example embodiment of the invention it is provided that the first communication protocol is the CCP or XCP protocol, and the second communication protocol is a client-specific diagnostic protocol, for example, the UDS protocol.

The methods according to the invention have the advantage that the memory space for the client-specific diagnostic protocol UDS is not needed in the LCU. Instead, in the LCU memory, space is only needed for a less memory-space-intensive protocol, for example, the CCP or XCP protocol.

In an example embodiment of the invention it is provided that with every information exchange between the third control unit and the first control unit, a change of the communication protocol is carried out in the second control unit, depending on the direction of the information exchange. The change occurs by means of a translation between the two communication protocols.

In an example embodiment of the invention it is provided that with every information exchange from the third control unit in the direction of the first control unit, a change of the communication protocol from the second communication protocol to the first communication protocol is carried out in the second control unit.

In an example embodiment of the invention it is provided that with every information exchange from the first control unit in the direction of the third control unit, a change of the communication protocol from the first communication protocol to the second communication protocol is carried out in the second control unit.

So to continue an information exchange, a change takes place in the TCU, i.e., a translation from one communication protocol into the other, since the first and third control units have no common communication protocol.

The following section explains variants of a first preferred embodiment.

In an example variant of the first embodiment of the invention it is provided that the third control unit causes a computer program to be transferred, by means of a diagnostic command of the second communication protocol, into the memory area of the second control unit.

In an example variant of the first embodiment of the invention it is provided that the computer program is a flash routine and/or a computer program for the first control unit, such as, for example, an application SW program for the first control unit (an LCU application SW program).

Instead of a computer program for the first control unit (LCU SW), this may also be the transfer of startup data of startup parameters, obtained and present in the tester (third control unit), into the memory area of the first control unit (LCU).

However, the flash routine may also already be present in the memory area of the second control unit (TCU) and available on the second control unit (TCU). So, it may also have reached the memory area of the second control unit (TCU) in a different way.

In an example variant of the first embodiment of the invention it is provided that the second control unit is caused by means of the flash routine to transfer the application SW program for the first control unit by means of the first communication protocol into the memory area of the first control unit, while the flash routine and the application SW program for the first control unit are available in the memory area of the second control unit, and while the flash routine is caused to transfer the application SW program by means of a diagnostic command of the second communication protocol issued by the third control unit.

The following section explains variants of a second especially preferred embodiment, an alternative to the first embodiment:

In an example variant of the second embodiment of the invention it is provided that in the second control unit a protocol translator program (translator) is available, which carries out the change of communication protocol. By protocol translator, it is meant a protocol converter, which is well known in the art as a device used to convert standard or proprietary protocol of one device to the protocol suitable for the other device or tools to achieve the interoperability.

In an example variant of the second embodiment of the invention it is provided that in the second control unit (TCU) a gateway function is available for change-free transmission of information or data or computer programs through the second control unit (TCU).

For example, this may be the transfer of startup data of startup parameters, obtained and present in the tester, into the memory area of the LCU.

In an example variant of the second embodiment of the invention it is provided that the third control unit (tester), by means of a diagnostic command of second communication protocol (460), causes a computer program or startup data to be transferred into the memory area of the first control unit (LCU).

In an example variant of the second embodiment of the invention it is provided that the third control unit (tester), by means of a diagnostic command of second communication protocol (460), causes a computer program or startup data to be transferred into the memory area of the first control unit (LCU), whereupon the diagnostic command of second communication protocol (460) is translated in the second control unit (TCU) by means of the protocol translator program (translator) into a diagnostic command of first communication protocol (450), and/or the computer program for the first control unit (LCU) or the startup data are conducted through the second control unit (TCU) without change by means of the gateway function.

By means of the gateway function and the protocol translator program according to the second embodiment of the invention, neither a flash routine nor the application SW program for the first control unit (LCU application SW program) first has to be brought into the memory area of the second control unit in its entirety, but instead the application SW program for the first control unit (LCU application SW program) present in the third control unit (tester) can be brought in its entirety or "by data packets" into the memory area of the first control unit (LCU) by means of a flash routine, which however now must be present only in the third control unit (tester), or without any flash routine but rather directly by means of commands (diagnostic commands), via the gateway of the TCU. The commands which this requires are sent, emitted from the flash routine or directly through commands (diagnostic commands) of the third control unit (tester) to the second control unit (TCU), and when commands are directed at the first control unit (LCU) are translated directly in the second control unit (TCU) TCU and forwarded to the first control unit (LCU). Replies from the first control unit (LCU) are likewise retranslated immediately upon arrival in the second control unit (TCU) and are also forwarded directly to the third control unit (tester), so that a so-called "simultaneous translation" can take place in the second control unit (TCU) when messages are exchanged in particular between the third control unit (tester) and the first control unit (LCU). In this way the communication can take place between the third and the first control units, both of which use different communication protocols, almost exactly as quickly as between the third and the second control units, both of which use the same communication protocol; the only difference is the direct communication translation in the second control unit, which in practice does not cause any relevant delay. So effectively, the communication but also any data transfer can take place just as bidirectionally between the third and the first control units as between the third and the second control units.

In an example variant of the second embodiment of the invention it is provided that during the change-free transmission, the computer program for the first control unit (LCU) or the startup data are stored temporarily in the memory area of the second control unit (TCU), before being forwarded to the first control unit (LCU).

In an example variant of the second embodiment of the invention it is provided that during the change-free transmission, the computer program for the first control unit (LCU) or the startup data are stored temporarily by data packets in the memory area of the second control unit (TCU) and forwarded to the first control unit (LCU).

The expression "by data packets" is intended to mean within the framework of this document that a data packet may thus comprise less than the whole computer program, or less than all of the startup data. The data packet size may be specified, and may be oriented, for example, on the size of the memory area of the second control unit (TCU). After the intermediate storage, this packet is forwarded to the first control unit (LCU). Another data packet is then stored temporarily in the second control unit (TCU) and then likewise forwarded, etc., until all of the data of the computer program or all of the startup data have been transmitted. The transmission takes place within the framework of this document in the sense "change-free," as the computer program or the startup data are exactly as present in the memory area of the first control unit (LCU) after transmission as they were present prior to transmission in the memory area of the third control unit (tester) from which they were transmitted.

In an example variant of the second embodiment of the invention it is provided that the forwarding of the computer program for the first control unit (LCU) or of the startup data from the second control unit (TCU) to the first control unit (LCU) takes place by means of the diagnostic command translated by the protocol translator program (translator) into first communication protocol (450).

In an example variant of the second embodiment of the invention it is provided that the computer program is an application SW program (LCU SW) for the first control unit.

In an example variant of the second embodiment of the invention it is provided that instead of a computer program it involves startup data of startup parameters which are present in the third control unit (tester), and which are to be stored in the memory area of the first control unit (LCU).

In the following section, variants of a third especially preferred embodiment, an alternative to the first and second embodiments, will be explained:

In an example variant of the third embodiment of the invention it is provided—as in the second embodiment— that in the second control unit a protocol translator program (translator) is available, which carries out the change of communication protocol.

In an example variant of the third embodiment of the invention it is provided that the third control unit (tester), by means of a diagnostic command of second communication protocol (460), causes startup data to be transferred from the memory area of the first control unit (LCU) into the memory area of the second control unit (TCU).

For example, this may be the transfer of startup data of startup parameters stored in the memory area of the first control unit (LCU) into the memory area of the second control unit (TCU). The startup data are obtained, for example, in the transmission works, transferred into the memory area of the first control unit (LCU) and stored there, and later in the vehicle works are recovered again from the memory area of the first control unit (LCU) into the memory area of the second control unit (TCU), since the second control unit (TCU) intended for the vehicle is not connected to the motor vehicle transmission, and in particular to the first control unit (LCU) of the motor vehicle transmission, until it reaches the vehicle works. The startup data obtained in the transmission works are therefore not stored in the second control unit (TCU) in the transmission works, since the second control unit (TCU) is not transferred into the vehicle works along with the motor vehicle transmission including the first control unit (LCU). The startup data for the motor vehicle transmission must therefore be stored in the first control unit (LCU).

In an example variant of the third embodiment of the invention it is provided that the third control unit (tester), by means of a diagnostic command of second communication protocol (460), causes startup data to be transferred from the memory area of the first control unit (LCU) into the memory area of the second control unit (TCU), whereupon the diagnostic command of second communication protocol (460) is translated in the second control unit (TCU) by means of the protocol translator program (translator) into a diagnostic command of first communication protocol (450) and is forwarded to the first control unit (LCU), so that the startup data are transferred from the memory area of the first control unit (LCU) into the memory area of the second control unit (TCU).

The following section explains preferred embodiments both of the variants of the first and also those of the second and third preferred embodiments.

In an example embodiment of the invention it is provided that the protocol translator program (translator) translates a diagnostic command of the one communication protocol directly into a diagnostic command of the other communication protocol.

The term "directly" describes that the translation of the diagnostic command takes place immediately, if the TCU does not give preference to higher-priority tasks of the translation.

In this way there is a "simultaneous translation," so that a rapid command exchange, or a rapid exchange between command and confirmation or response or the like is possible for example, between the third (tester) and first (LCU) control units.

In an example embodiment of the invention it is provided that the information exchange between the third and the first control units is carried out exclusively through the second control unit.

In an example embodiment of the invention it is provided that the first control unit is a local actuator control unit LCU for controlling the clutch actuator and/or the transmission actuator, and wherein the second control unit is a transmission control unit TCU for controlling the clutch and/or for controlling the transmission, and wherein the third control unit is a tester or a test bench computer.

In an example embodiment of the invention it is provided that the motor vehicle transmission is a dual-clutch transmission system.

In an example embodiment of the invention it is provided that the first communication protocol is the CCP or XCP protocol, and the second communication protocol is a client-specific diagnostic protocol, in particular the UDS protocol.

These and other objects, advantages and features of the present invention will be better appreciated by those having ordinary skill in the art in view of the following detailed description of the invention in view of the drawings.

BRIEF DESCRIPTION OF THE DRAWINGS

The nature and mode of operation of the present invention will now be more fully described in the following detailed description of the invention taken with the accompanying figures, in which:

FIG. 3 shows a schematic depiction of a second stage of the first preferred embodiment of the method according to the invention; and, FIG. 4 shows a schematic depiction of the second and third preferred embodiments of the method according to the invention.

DETAILED DESCRIPTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
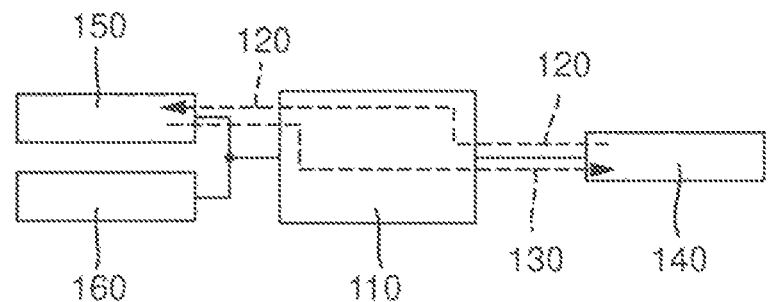
FIG. 1 shows the flashing of a local control unit by means of a diagnostic tester and a gateway function in a transmission control unit.
Figure 2:
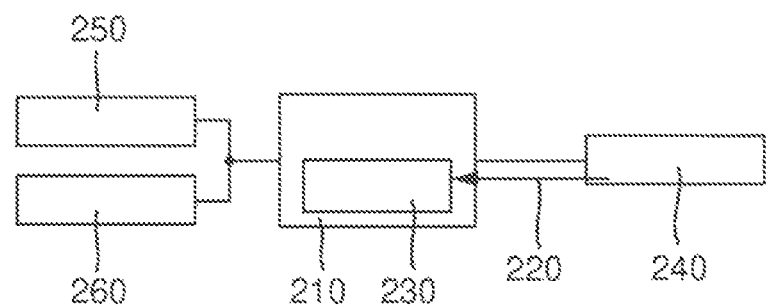
FIG. 2 shows a schematic depiction of a first stage of the first preferred embodiment of the method according to the invention.

The flash process is subdivided into multiple steps: Step 1: Flashing of the LCU SW into control unit (TCU) 210 (see FIG. 2); and, Step 2: Activation of an LCU flash routine within TCU 310 (see FIG. 3).

Explanation of Step 1 (See FIG. 2):

TCU control unit 210 has significantly more free memory space than the LCU: to that extent, the possibility exists to flash the program code for the LCU into TCU 210, namely into a memory area that is not needed. This flash process can take place by means of the client's own diagnostic protocol. The client's own diagnostic protocol may be, for example, the UDS protocol.

Explanation of Step 2 (See FIG. 3):

After completion of the flashing of the LCU application SW LCU SW 300 into TCU 310, a diagnostic service for flashing the LCU is called 320 by the tester, again by means of client-specific diagnostic protocol 360. This service starts a function within TCU 310, the LCU flash routine—referred to hereinafter as flash routine A or also as function A—which flashes 330 the LCU application SW program code LCU SW 300 from TCU 310 into LCU 380; this time, however, the calibration protocol which was used already during the development is used. This is, for example, the XCP or the CCP protocol.

This has the advantage that the memory space for the client-specific diagnostic protocol, such as UDS 360, is not needed in LCU 380, but only memory space for a less memory-space-intensive protocol 350, such as, for example, the XCP or the CCP protocol. In addition, memory space is needed in LCU 380 for the LCU application SW program code 300 flashed into LCU 380. LCU application SW program code 300, which is flashed into LCU 380, the flash routine A, which carries out flashing 330 of the LCU application SW program code from the TCU into the LCU, and both protocols 350, 360 are needed in TCU 310.

Sequence:

The following steps are carried out in client-specific diagnostic protocol 360: Step 1 (see FIG. 2): Tester 240 flashes 220 LCU SW 230 into TCU control unit 210 by means of client-specific diagnostic protocol; TCU 210 carries out the diagnostic command and acknowledges accordingly. Step 2 (see FIG. 3): After completion of flash process 220, by means of client-specific diagnostic protocol 360 a function A is called 320 in TCU 310 by tester 370 which carries out the flashing of LCU 380. The status of this routine is reported back 340 to the tester accordingly.

The following steps are carried out in CCP/XCP protocol 350: The TCU function A now flashes 330 LCU 380 by means of the calibration protocol (e.g., CCP/XCP); the status of this function A is known to the TCU.

The following steps are carried out in client-specific diagnostic protocol 360: The status of this function A is reported back 340 in the direction of the tester by means of client-specific diagnostic protocol 360.

An incorporation of a SW functionality into the TCU/LCU SW is also provided, in order to ease the problem of memory capacity in the LCU.

Since the system consists of 2 LCUs 380, 390, both LCUs must also be flashed; the following options turn out to be expedient:
1. LCU SW 300 is identical for both LCUs 380, 390:
  1.1 Function A first flashes 330 LCU 380 and then LCU 390 (or vice versa).
  1.2 Function A obtains through tester 370 the information about which LCU is to be flashed, and according flashes only that LCU. The two functions A do not differ otherwise.
2. LCU SW 300 is different for the two LCUs 380, 390:
  2.1 The tester first flashes 220 SW 300 for LCU 380 into TCU 310. After that the tester calls function A 320, which flashes 330 LCU 380. Next the SW for LCU 390 is flashed 220 into the TCU, after which function B is called 320, which flashes LCU 390.
  2.2 Tester 370 first flashes 220 SW 300 for LCU 380 into TCU 310. After that, tester 370 calls 320 function A with the reference to LCU 380, which flashes 330 LCU 380. Next, SW 300 for LCU 390 is flashed into the TCU, after which function A is called 320 with the reference to LCU 390, which flashes LCU 390.
  2.3 The tester flashes the SW for LCU 380 and LCU 390 into TCU 310. After that, tester 370 calls function A 320, which flashes LCU 380 and then LCU 390 (or vice versa).

On the basis of FIG. 4, in the following section a second solution will be explained, which is an alternative to the first.

In this case, in TCU 410, both protocol translator program (translator) 400, which performs the change of the communication protocol, and gateway function 500 for the change-free transmission of information or data or computer programs through TCU 410, are available.

For example, this may be the transfer of startup data of startup parameters, obtained and present in tester 470, into the memory area of LCU 480.

To that end it is provided that tester 470, by means of a diagnostic command of second communication protocol UDS 460, causes a computer program or startup data to be transferred into the memory area of LCU 480.

At the same time, tester 470, by means of a diagnostic command of second communication protocol 460, causes a computer program or startup data to be transferred into the memory area of LCU 480, whereupon the diagnostic command of second communication protocol 460 is translated in TCU 410 by means of the protocol translator program (translator) 400 into a diagnostic command of first communication protocol 450, and/or the computer program for LCU 480 or the startup data are conducted through TCU 410 without change by means of gateway function 500.

Neither a flash routine nor the application SW program for the LCU (LCU application SW program) first has to be brought into the memory area of the second control unit in its entirety by means of gateway function 500 and protocol translator program 400, but instead the application SW program for the LCU (LCU application SW program) present in tester 470 can be brought in its entirety or "by data packets" into the memory area of LCU 480 by means of a flash routine, which however now must be present only in tester 470, or without any flash routine but rather directly by means of commands (diagnostic commands), via gateway 500 of TCU 410. The commands which this requires are sent, emitted from the flash routine or directly through commands (diagnostic commands) of tester 470 to TCU 410, and when commands are directed at LCU 480, are translated directly in the TCU and forwarded to LCU 480. Replies from LCU 480 are likewise retranslated directly after arrival in TCU 410, and are also forwarded directly to tester 470, so that a so-called "simultaneous translation" can take place in the TCU when messages are exchanged, in particular between tester 470 and LCU 480. In this way, the communication can take place between tester 470 and LCU 480, both of which use different communication protocols, almost exactly as quickly as between tester 470 and TCU 410, both of which use the same communication protocol; the only difference is the direct communication translation in TCU 410, which in practice does not cause any relevant delay. So, effectively, the communication but also any data transfer can take place just as bidirectionally between tester 470 and LCU 480 as between tester 470 and TCU 410.

Optionally, during the change-free transmission, the computer program for the LCU or the startup data can be stored temporarily in the memory area of TCU 410, before being forwarded to LCU 480.

Optionally, during the change-free transmission, the computer program for LCU 480 or the startup data can be stored temporarily by data packets in the memory area of TCU 410, and forwarded to LCU 480.

The expression "by data packets" is intended to mean within the framework of this document that a data packet may thus comprise less than the whole computer program, or less than all of the startup data. The data packet size may be specified, and may be oriented for example, on the size of the memory area of TCU 410. After the intermediate storage this packet is forwarded to LCU 480. Next, another data packet is stored temporarily in TCU 410 and then likewise forwarded, etc., until the entire computer program or all of the startup data have been transmitted. The transmission takes place within the framework of this document in the sense "change-free," as the computer program or the startup data are exactly as present in the memory area of LCU 480 after transmission as they were present prior to transmission in the memory area of tester 470 from which they were transmitted.

The transmission of the computer program for LCU 480 or of the startup data from TCU 410 to LCU 480 takes place by means of the diagnostic command translated by the protocol translator program (translator) into first communication protocol 450.

The computer program may be, for example, an application SW program (LCU SW), LCU 480.

Instead of a computer program, it may be startup data of startup parameters that are present in tester 470, and that are to be stored in the memory area of LCU 480.

A third embodiment of the invention will now be explained on the basis of FIG. 4.

As in the second embodiment, it is provided that in TCU 410, protocol translator program (translator) 400 is available, which carries out the change of communication protocol.

By means of a diagnostic command of second communication protocol 460, tester 470 causes startup data to be transferred from the memory area of LCU 480 into the memory area of TCU 410.

For example, this may be the transfer of startup data of startup parameters stored in the memory area of LCU 480 into the memory area of TCU 410. The startup data are obtained, for example, in the transmission works, transferred into the memory area of LCU 480 and stored there, and later in the vehicle works recovered again from the memory area of LCU 480 into the memory area of TCU 410, since TCU 480 intended for the vehicle is not connected to the motor vehicle transmission, and in particular to LCU 480 of the motor vehicle transmission, until it reaches the vehicle works. The startup data obtained in the transmission works are therefore not stored in the transmission works in the TCU used there, which in most cases is integrated into a test bench computer, since this TCU is not transferred to the vehicle works with the motor vehicle transmission including LCU 480. The startup data for the motor vehicle transmission must therefore be stored in LCU 480.

Tester 470, by means of a diagnostic command of second communication protocol 460, causes startup data to be transferred from the memory area of LCU 480 into the memory area of TCU 410, whereupon the diagnostic command of second communication protocol 460 is translated in TCU 410 by means of protocol translator program (translator) 400 into a diagnostic command of first communication protocol 450 and is forwarded to LCU 480, so that the startup data are transferred from the memory area of LCU 480 into the memory area of TCU 410.

Protocol translator program (translator) 400 translates a diagnostic command of the one communication protocol directly into a diagnostic command of the other communication protocol.

The term "directly" describes that the translation of the diagnostic command takes place immediately, if the TCU does not give preference to higher-priority tasks of the translation.

In this way, there is a "simultaneous translation," so that a rapid command exchange or a rapid exchange between command and confirmation or response or the like for example, between tester 470 and LCU 480 is possible, so that bidirectional communication can also occur between tester 470 and LCU 480.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

110 TCU control unit with gateway function
120 TCU forwards commands from the tester to the LCU
130 TCU sends responses of the LCU back to the tester
140 Tester
150 LCU clutch 1
160 LCU clutch 2
210 TCU control unit with gateway function
220 Flashing of the LCU software into the TCU
230 LCU software (LCU SW)
240 Tester
250 LCU clutch 1
260 LCU clutch 2
300 LCU software (LCU SW)
310 TCU control unit with gateway function
320 Tester calls function A in the TCU by means of client-specific diagnostic protocol
330 TCU flash function A flashes the LCU SW into the LCU by means of CCP/XCP calibration protocol
340 Status feedback to the tester by means of client-specific diagnostic protocol
350 CCP protocol or XCP protocol
360 Client-specific diagnostic protocol (UDS)
370 Tester
380 LCU clutch 1
390 LCU clutch 2
400 Protocol translator program (translator)
410 TCU control unit with gateway function and protocol translator program (translator)
420 in the TCU, messages (e.g., commands) of the tester to the LCU are translated by protocol translator 400 and sent to the LCU
430 in the TCU, messages (e.g., responses) of the LCU to the tester are translated by protocol translator 400 and sent to the tester
440 Bidirectional communication between tester and TCU
450 CCP protocol or XCP protocol
460 Client-specific diagnostic protocol (UDS)
470 Tester
480 LCU clutch 1
490 LCU clutch 2
500 Gateway

What is claimed is:

1. A method for controlling a motor vehicle transmission, said motor vehicle transmission having a transmission actuator to actuate said vehicle transmission, a vehicle clutch with a clutch actuator to actuate said vehicle clutch, a first control unit having a first memory area, a second control unit having a second memory area, and a third control unit, said method for controlling said motor vehicle transmission comprising the steps of:
   exchanging information between said first and third control units via said second control unit;
   exchanging information between said first and said second control units on the basis of a first communication protocol;
   exchanging information between said second and said third control units on the basis of a second communication protocol; and,
   controlling said motor vehicle transmission based on said exchanged information between said first and said third control units, said first and said second control units, and said second and said third control units.

2. The method recited in claim 1, wherein said first communication protocol is available on said first control unit and on said second control unit and said second communication protocol is available on said second control unit and on said third control unit.

3. The method recited in claim 1, wherein a first amount of memory needed for said first communication protocol is less than a second amount of memory needed for said second communication protocol.

4. The method recited in claim 1, further comprising the step of changing said first communication protocol and/or said second communication protocol in said second control unit when exchanging information between said first and said third control units and depending on the direction of the information exchange.

5. The method recited in claim 1, further comprising the step of changing said second communication protocol to said first communication protocol in said second control unit when there is an information exchange from said third control unit in the direction of said first control unit.

6. The method recited in claim 1, further comprising the step of changing said first communication protocol to said second communication protocol in said second control unit when there is an information exchange from said first control unit in the direction of said third control unit.

7. The method recited in claim 1, further comprising the step of causing a computer program to be transferred into said second memory area of said second control unit via said third control unit by means of a diagnostic command of said second communication protocol.

8. The method recited in claim 7, wherein said computer program is a flash routine.

9. The method recited in claim 7, wherein said computer program is a computer program for said first control unit.

10. The method recited in claim 7, wherein said computer program is an application software program for said first control unit.

11. The method recited in claim 7, further comprising the step of causing said second control unit by means of a flash routine to transfer an application software program for said first control unit into said first memory area of said first control unit by means of said first communication protocol, while said flash routine and said application software program for said first control unit are available in said second memory area of said second control unit, and causing said flash routine to transfer said application software program by means of a diagnostic command of said second communication protocol issued by said third control unit.

12. The method recited in claim 1, further comprising a protocol translator program in said second control unit, said protocol translator program changing said first or said second communication protocols.

13. The method recited in claim 12, further comprising a gateway function in said second control unit, said gateway function operatively arranged to provide a change-free transmission of information or data or computer programs through said second control unit.

14. The method recited in claim 12, further comprising the step of causing a computer program or startup data to be transferred into said first memory area of said first control unit via said third control unit by means of a diagnostic command of said second communication protocol.

15. The method recited in claim 14, further comprising the step of translating said diagnostic command of said second communication protocol in said second control unit by means of said protocol translator program into a diagnostic command of said first communication protocol, and/or conducting said computer program for said first control or said startup data unit through said second control unit without change by means of a gateway function.

16. The method recited in claim 15, further comprising the step of temporarily storing said computer program for said first control unit or said startup data in said second memory area of said second control unit during a change-free transmission and before being forwarded to said first control unit.

17. The method recited in claim 15, further comprising the step of temporarily storing said computer program for said first control unit or said startup data by data packets in said second memory area of said second control unit during a change-free transmission and forwarding said computer program for said first control unit or said startup data to said first control unit.

18. The method recited in claim 17, further comprising the step of translating a diagnostic command by said protocol translator program into said first communication protocol when said forwarding of said computer program for said first control unit or of said startup data from said second control unit to said first control unit takes place.

19. The method recited in claim 13, wherein said computer program is an application software program for said first control unit.

20. The method recited in claim 1, further comprising the step of storing startup data of startup parameters, which are present in said third control unit, in said first memory area of said first control unit.

21. The method recited in claim 12, further comprising the step of transferring startup data from said first memory area of said first control unit into said second memory area of said second control unit, said transferring caused by said third control unit, by means of a diagnostic command of said second communication protocol.

22. The method recited in claim 21, further comprising the steps of translating said diagnostic command of said second communication protocol into a diagnostic command of said first communication protocol, said translating occurring in said second control unit by means of said protocol translator program, and forwarding to said first control unit so that said startup data are transferred from said first memory area of said first control unit to said second memory area of said second control unit.

23. The method recited in claim 1, further comprising the step of translating a first diagnostic command of a first communication protocol directly into a second diagnostic command of a second communication protocol, said translating caused by a protocol translator.

24. The method recited in claim 1, wherein said exchanging information between said third and said first control units is carried out exclusively through said second control unit.

25. The method recited in claim 1, wherein said first control unit is a local actuator control unit for controlling said clutch actuator and/or said transmission actuator, and wherein said second control unit is a transmission control unit for controlling said clutch and/or for controlling said transmission, and wherein said third control unit is a tester or a test bench computer.

26. The method recited in claim 1, wherein said motor vehicle transmission is a dual-clutch transmission.

27. The method recited in claim 1, wherein said first communication protocol is an Open-source CAN Calibration Protocol (CCP).

28. The method recited in claim 1, wherein said first communication protocol is a Universal Measurement and Calibration Protocol (XCP).

29. The method recited in claim 1, wherein said second communication protocol is a client-specific diagnostic protocol.

30. The method recited in claim 1, wherein said second communication protocol is a Unified Diagnostic Services (UDS) protocol.

* * * * *